United States Patent [19]

Yoshitsugu et al.

[11] Patent Number: 4,597,587
[45] Date of Patent: Jul. 1, 1986

[54] SEATBELT SYSTEM

[75] Inventors: Noritada Yoshitsugu; Motonobu Sugiura; Yutaka Matsuzaki, all of Toyota, Japan

[73] Assignee: Toyota Jidosha Kabushiki Kaisha, Toyota, Japan

[21] Appl. No.: 675,397

[22] Filed: Nov. 27, 1984

[30] Foreign Application Priority Data

Nov. 28, 1983 [JP] Japan ............................ 58-183303[U]

[51] Int. Cl.⁴ .............................................. B60R 22/34
[52] U.S. Cl. .............................. 280/807; 242/107.4 R; 280/803
[58] Field of Search ............... 280/801, 802, 803, 807; 242/107, 107.4 R

[56] References Cited

U.S. PATENT DOCUMENTS

| 4,413,841 | 11/1983 | Matsuoka et al. | 280/802 |
| 4,478,433 | 10/1984 | Taguchi et al. | 280/807 |
| 4,529,143 | 7/1985 | Kanada et al. | 280/807 |

Primary Examiner—John J. Love
Assistant Examiner—Ross Weaver
Attorney, Agent, or Firm—Cushman, Darby & Cushman

[57] ABSTRACT

A seatbelt system includes a webbing which has one end thereof attached to a door of a vehicle and is automatically fastened to an occupant of the vehicle in response to the action of opening and closing the door. The webbing tension is decreased when the door is opened, whereby it is possible to reduce the resistance due to the webbing tension encountered when the door is opened. Further, when the door is closed, the webbing tension is increased, thereby bringing the webbing into close contact with the occupant.

21 Claims, 11 Drawing Figures

SEATBELT SYSTEM

BACKGROUND OF THE INVENTION

1. Field of the Invention

The present invention relates to seatbelt systems for preventing movement of an occupant in a vehicle. More particularly, the invention pertains to a seatbelt system capable of automatically fastening an occupant restraining webbing to the occupant after he is seated.

2. Description of the Prior Art

A typical conventional seatbelt system is arranged such that an occupant of a vehicle is fastened with an occupant restraining webbing and is prevented from movement by the webbing during vehicular emergencies.

In order to automatically fasten the webbing to the occupant after he has seated himself in the vehicle, a seatbelt system has been proposed which is arranged such that one end of the webbing is attached to a door of the vehicle, and the webbing is driven in response to the action of opening and closing the door such as to be automatically fastened to or unfastened from the occupant. Examples of this type of seatbelt system include those shown in the specifications of Japanese Patent Publication Nos. 42,818/1976, 47,212/1977 and 26,019/1978 as well as Japanese Utility Model Publication No. 32,420/1978. In this type of seatbelt system, the end portion of the webbing which is opposite to the end portion thereof attached to the door is wound up by means of a bias into a webbing retractor which is mounted on a floor member of the vehicle.

Accordingly, when the occupant opens the door, the end portion of the webbing attached to the door is moved toward the front end of the vehicle, and an intermediate portion of the webbing is wound off from the webbing retractor. In such case, the counterforce relative to the wind-off of the webbing unfavorably acts against the door opening force as a resistance. Further, when the door is opened, the moving webbing may disadvantageously rub against the body of the occupant in the early stage of movement of the webbing.

SUMMARY OF THE INVENTION

In view of the above-described facts, a primary object of the present invention is to provide a seatbelt system including a webbing which has one end thereof attached to a door of a vehicle and is automatically fastened to or unfastened from an occupant of the vehicle in response to the action of opening and closing the door, the seatbelt system being capable of reducing the resistance to the door opening force and further reducing the frictional resistance between the webbing and the body of the occupant when the webbing is moved.

To this end, according to the invention, there is provided a seatbelt system in which a takeup shaft, which is mounted on a floor member of a vehicle and is adapted to wind up the other end of the webbing, is biased to rotate in the webbing wind-up direction by means of a resilient member, and if the tension of the webbing exceeds a predetermined value when the door is opened, a control means decreases the biasing force of the resilient member such that the counterforce relative to the wind-off of the webbing is reduced and the webbing tension is also reduced, thereby facilitating the door opening operation and reducing the frictional resistance between the webbing and the body of the occupant when the webbing is moved.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and in which.

DESCRIPTION OF THE PREFERRED EMBODIMENTS

Figure 1:
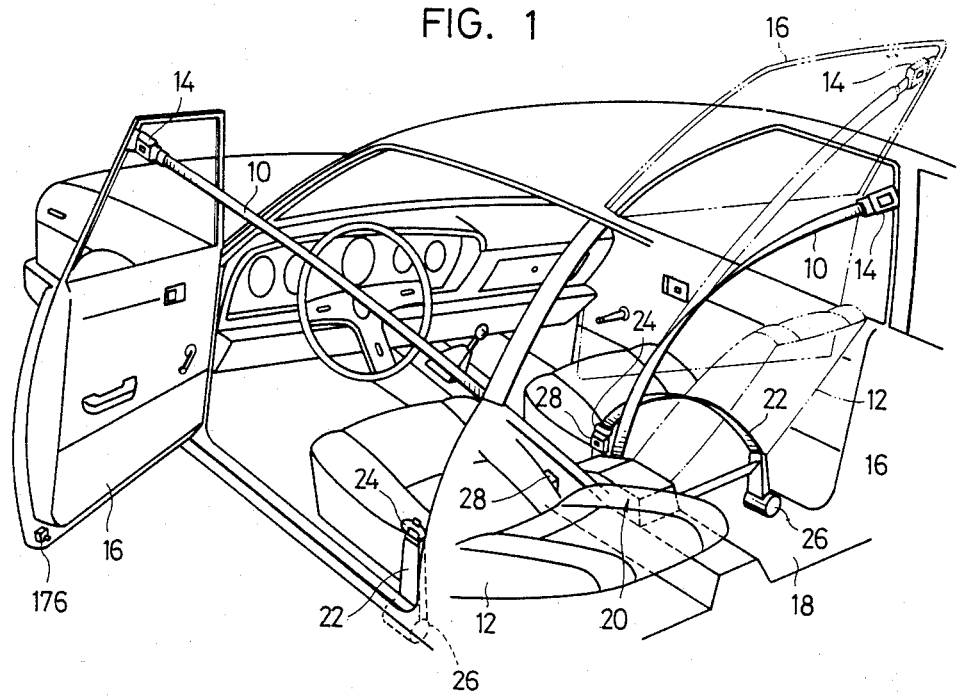
FIG. 1 is a perspective view of an automobile for showing a first embodiment of the seatbelt system in accordance with the present invention.

FIG. 1 shows an automobile to which the seatbelt system in accordance with an embodiment of the present invention is applied. This embodiment is arranged such that shoulder webbings 10 are automatically fastened to respective occupants as they seat themselves in seats 12.

More specifically, the end portion of each shoulder webbing 10 on the side thereof which is closer to the outside of the vehicle is engaged through a shoulder anchor 14 with an upper portion of a door 16 on the side thereof which is closer to the rear end of the vehicle. On the other hand, the end portion of each shoulder webbing 10 on the inner side of the vehicle is wound up into a webbing retractor 20 which is mounted on a floor member 18 in the center of the vehicle. Each shoulder anchor 14 may be of a structure which allows the corresponding shoulder webbing 10 to be removed therefrom, if necessary.

Figure 2:
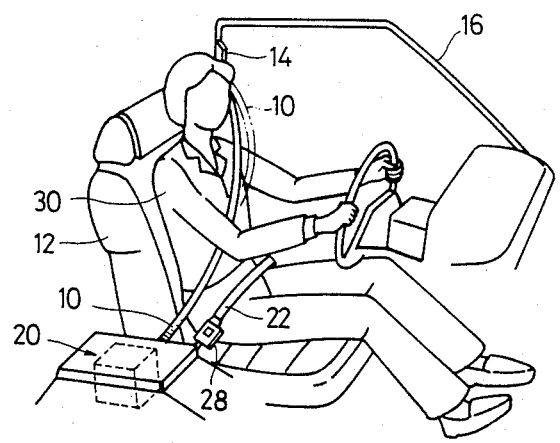
FIG. 2 is a perspective view of the automobile shown in FIG. 1 as viewed from the inside of the compartment thereof, particularly showing how an occupant restraining webbing is fastened to an occupant.
Figure 3:
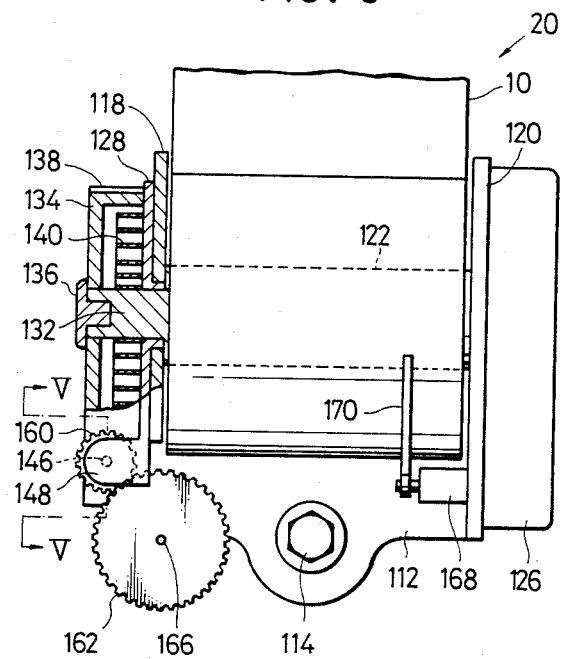
FIG. 3 is a front elevational view of a webbing retractor employed in the first embodiment.

Further, a lap webbing 22 is disposed on the floor member 18 on the side of each seat 12 which is closer to the outside of the vehicle. The lap webbing 22 has a tongue plate 24 attached to the distal end portion thereof. The proximal portion of the lap webbing 22 is wound up by a bias into a webbing retractor 26 which is mounted on the floor member 18. A buckle device 28 is attached to the side of each seat 12 which is on the inner side of the vehicle such as to correspond to the tongue plate 24. As shown in FIG. 2, an occupant 30 seated in the seat 12 manually winds off the lap webbing 22 from the webbing retractor 26 and engages the tongue plate 24 with the buckle device 28, thereby allowing the occupant 30 to be fastened with the lap webbing 22. It is to be noted that the webbing retractor 26 incorporates therein an inertia-lock mechanism which abruptly stops the wind-off of the lap webbing 22 in an emergency situation of the vehicle.

Next, the webbing retractor 20 will be explained with reference to FIGS. 3 to 7.

The webbing retractor 20 for winding up the shoulder webbing 10 has a frame 112 which is secured to the floor member 18 by means of a bolt 114.

The frame 112 has a pair of leg plates 118, 120 which are extended from both side portions thereof such as to be in parallel to each other.

These leg plates 118, 120 rotatably support the corresponding end portions of a takeup shaft 122. At an intermediate portion of the takeup shaft 112, one end of the shoulder webbing 10 is retained and one end portion thereof is wound up on the takeup shaft 112 in layers.

On the outside of the leg plate 120, an inertia-lock mechanism 126 is mounted between the leg plate 120 and the takeup shaft 122. The inertia-lock mechanism 126 has a structure which is generally employed and is adapted to abruptly stop the rotation of the takeup shaft 122 for winding off the webbing 10 in a vehicular emergency by detecting an acceleration of the vehicle body or an acceleration of wind-off of the shoulder webbing 10.

A plate-like holder 128 is secured to the outside of the leg plate 118 by screws 130. A smaller-diameter portion 132 formed at the end portion of the takeup shaft 122 extends through the holder 128. A spring casing 134 is rotatably supported at its bottom plate portion by the distal end portion of the smaller-diameter portion 132. The spring casing 134 is prevented from coming off from the smaller-diameter portion 132 by means of a stopper 136 which is press-fitted into the distal end portion of the smaller-diameter portion 132.

Further, the spring casing 134 is formed on the outer peripheral portion thereof with a worm wheel 138 and retains at the inner peripheral portion thereof the outer end of a spiral spring 140. The spring 140 is disposed such as to be coaxial with the smaller-diameter portion 132 and has its inner end retained by the smaller-diameter portion 132. Accordingly, the spring 140 is adapted to apply a force to the takeup shaft 122 for winding up the webbing 10. In addition, as the spring casing 134 is rotated in the direction of the arrow d in FIG. 4, the spring 140 increases its biasing force to increase the force applied to the takeup shaft 122 in the webbing wind-up direction. On the other hand, when the spring casing 134 is rotated in the direction of the arrow D in FIG. 4, the spring 140 decreases its webbing wind-up biasing force.

Figure 5:
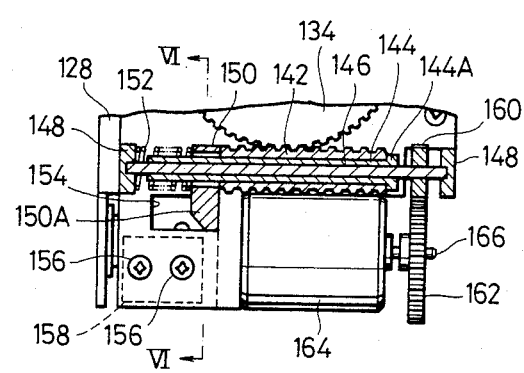
FIG. 5 is a sectional view taken along the line V—V of FIG. 1.
Figure 6:
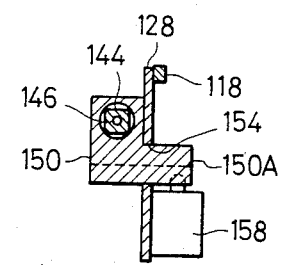
FIG. 6 is a sectional view taken along the line VI—VI of FIG. 5.

A worm 142 meshing with the worm wheel 138 is, as shown in FIG. 5, rotatably supported at brackets 148 of the holder 128 through a guide 144 and a shaft 146. More specifically, the guide 144 is secured to an intermediate portion, in the axial direction, of the shaft 146 which is rotatably supported at both end portions thereof by the brackets 148, such as to rotate with the shaft 146. The guide 144 has a rectangular outer configuration as shown in FIG. 6. The worm 142 is formed at its axial central portion with a rectangular bore through which the worm 142 fits with the guide 144. Accordingly, the worm 142 rotates with both the guide 144 and the shaft 146 and is still allowed to axially move relative to the guide 144 and the shaft 146.

The relative movement of the worm 142 is restricted by a larger-diameter portion 144A formed at one end (in the axial direction) of the guide 144, in one of the axial directions of the worm 142, namely, the direction in which the worm 142 receives a repulsion force of the spring 140 through the spring casing 134. Further, the guide 144 rotatably supports an actuator 150 through the worm 142 near the end portion thereof which is opposite to the larger-diameter portion 144A. The actuator 150 is, as shown in FIG. 6, provided with a circular bore for receiving the guide 144, thereby allowing the actuator 150 to rotate relative to the guide 144. The actuator 150 is further provided with a compression coil spring 152 interposed between the same and the bracket 148 of the holder 128 so as to be brought into resilient contact with the worm 142, thus enabling the actuator 150 to move with the worm 142 in the axial direction of the shaft 146.

Figure 7:
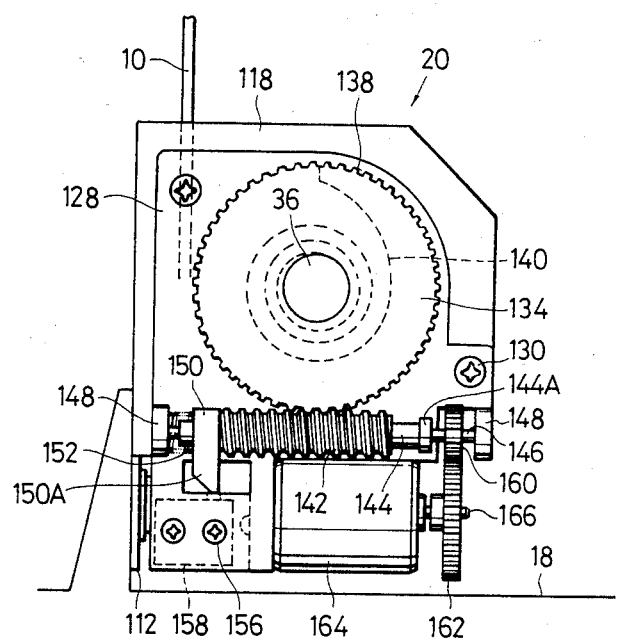
FIG. 7 is an illustration showing the operation of the webbing retractor shown in FIG. 4.

FIG. 5 shows the worm 142 and the actuator 150 in the state wherein the worm 142 has moved until they abut against the larger-diameter portion 144A, while FIG. 7 shows the worm 142 and the actuator 150 in the state wherein they have maximumly moved in the direction opposite to that moved in FIG. 5 against the biasing force of the compression coil spring 152.

The actuator 150 has, as shown in FIG. 6, its leg portion 150A extending through an opening 154 formed in the holder 128 such as to correspond to a limit switch 158 which is mounted on the opposite side of the holder 128 by screws 156. The limit switch 158 is OFF when it is separate from the actuator 150 as shown in FIG. 5 and is ON when it is in contact with the leg portion 150A of the actuator 150 as shown in FIG. 7.

The shaft 146 has a pinion 160 secured to the portion thereof near the larger-diameter portion 144A. The pinion 160 is meshed with a gear wheel 162. The gear wheel 162 is secured to an output shaft 166 of a motor 164 secured to the holder 128.

The leg plate 120 has a webbing wind-off amount detection switch 168 attached to the inner side thereof. The webbing wind-off amount detection switch 168 has a pivoting arm 170 projecting therefrom. The distal end portion of the pivoting arm 170 is urged such as to abut against the outer periphery of the portion of the shoulder webbing 10 wound up on the takeup shaft 122 in layers. Thus, the webbing wind-off amount detection switch 168 is able to detect whether or not the diameter of the portion of the shoulder webbing 10 wound up on the takeup shaft 122 is below a predetermined value.

Figure 8:
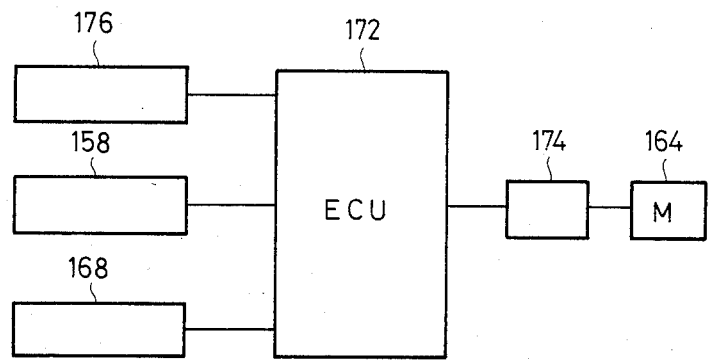
FIG. 8 is a diagram of a control circuit employed in the first embodiment.

FIG. 8 shows a control circuit for controlling the motor 164. This control is effected such that the motor 164 is actuated through a relay 174 by a control unit 172 having a microcomputer as its main component.

To the control unit 172 are transmitted the respective outputs of the limit switch 158 and the webbing wind-off amount detection switch 168, which have already been described above. Further transmitted to the control unit 172 is the output of a door switch 176 which is attached to the door 16, as shown in FIG. 1, so as to be able to detect the fact that the door 16 is open or closed.

The control unit 172 actuates the motor 164 to rotate through the relay 174 when the following set of conditions is satisfied: the detection signal from the door switch 176 shows the fact that the door is open; the detection signal from the webbing wind-off amount detection switch 168 shows the fact that the amount of the shoulder webbing 10 wound off is below a predetermined value; and the limit switch 158 being ON shows the fact that the tension of the webbing 10 exceeds a predetermined value. Consequently, the spring 140 is rotated in the direction of the arrow D in FIG. 4, whereby it is possible to decrease the biasing force of the spring 140. The rotation of the motor 164 is suspended when the webbing wind-off amount detection switch 168 detects the fact that the amount of the shoulder webbing 10 wound off exceeds a predetermined value.

Figure 4:
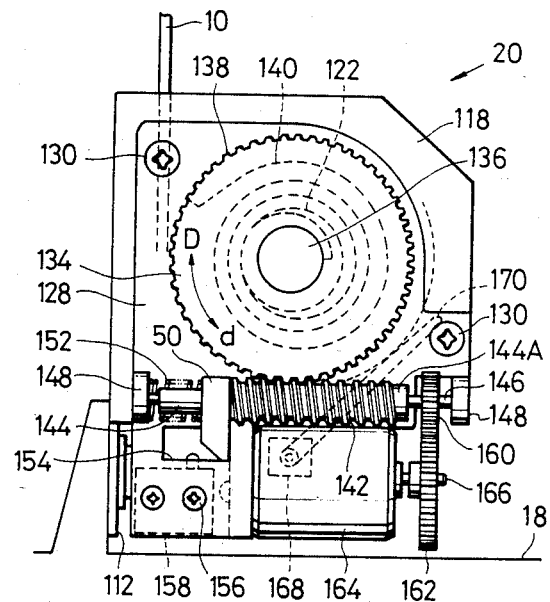
FIG. 4 is a side view of the webbing retractor shown in FIG. 3 as viewed from the left-hand side thereof.

Further, the control unit 172 actuates the motor 164 to rotate in the direction of the arrow d in FIG. 4 thereby increasing the webbing wind-up biasing force when the following set of conditions is satisfied: the detection signal from the door switch 176 shows the fact that the door 16 is closed; the detection signal from the webbing wind-off amount detection switch 168 shows the fact that the amount of the shoulder webbing 10 wound off exceeds a predetermined value; and the limit switch 158 is OFF. In this case, the rotation of the motor 164 is suspended when the limit switch 158 is turned ON.

The following is a description of the operation of the embodiment arranged as above.

FIG. 1 shows a driver's seat in the state wherein the door 16 has already been opened and an occupant 30 is allowed to seat himself in the seat 12. When the occupant 30 closes the door 16 after seating himself in the seat 12 as shown in FIG. 2, the occupant 30 is automatically fastened with the shoulder webbing 10.

In this case, the motor 164 causes the spring 140 to rotate in the direction in which the biasing force thereof is increased when the following set of conditions is satisfied: the door switch 176 detects the fact that the door 16 is closed; the webbing wind-off amount detection switch 168 detects the fact that the amount of the shoulder webbing 10 wound off exceeds a predetermined value; and the limit switch 158 being OFF shows the fact that the tension of the shoulder webbing 10 is below a predetermined value. Thus, the shoulder webbing 10 is brought into close contact with the occupant 30, thereby allowing the occupant 30 to be properly fastened with the webbing 10. If necessary, the occupant 30 engages the tongue plate 24 with the buckle device 28 after being fastened with the shoulder webbing 10, whereby the occupant 30 is brought into a three-point webbing fastened state.

When the occupant 30 opens the door 16 in order to leave the vehicle, the door switch 176 transmits to the control unit 172 a signal representing the fact that the door 16 is opened. When the tension of the shoulder webbing 10 is increased by a slight amount as the door 16 is opened, the limit switch 158 is turned ON. In this case, since the webbing wind-off amount detection switch 168 has already informed the control unit 172 that the amount of the shoulder webbing 10 wound off is below a predetermined value, the control unit 172 causes the motor 164 to rotate backwardly, thus causing the spiral spring 140 to rotate in the direction in which the biasing force thereof is decreased.

Thus, the occupant 30 is advantageously able to open the door 16 with a relatively small operating force. In addition, another advantageous effect is simultaneously offered as follows: Since the tension of the shoulder webbing 10 is decreased as shown by the imaginary line in FIG. 2, there is no possibility that the shoulder webbing 10 may rub against the body of the occupant 30 with a large frictional resistance despite the action of opening the door 16, so that it is possible to obtain a comfortable and automatic webbing unfastening operation.

It is to be noted that the rotation of the motor 164 when the door 16 is opened is suspended when the webbing wind-off amount detection switch 168 detects the fact that the amount of the shoulder webbing 10 wound off reaches a predetermined value.

Figure 9:
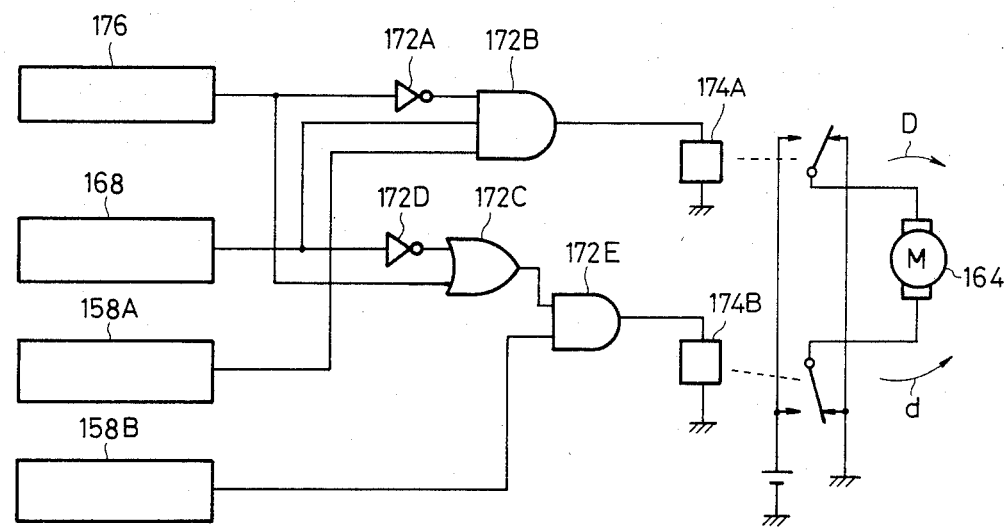
FIG. 9 is a diagram of a practical circuit in accordance with a second embodiment of the present invention which is also applicable to the first embodiment.

FIG. 9 is a diagram of a practical circuit in accordance with a second embodiment of the present invention which is also applicable to the above-described first embodiment.

This circuit also employs the door switch 176 and the webbing wind-off amount detection switch 168. The door switch 176 delivers a signal of L (low) level when the door 16 is open, and delivers a signal of H (high) level when the door 16 is closed. The output of the door switch 176 is supplied to an AND element 172B through an inverting element 172A and to an OR element 172C. On the other hand, the webbing wind-off amount detection switch 168 delivers a signal of L level only when the amount of the shoulder webbing 10 wound off from the webbing retractor 20 exceeds a predetermined value at which the webbing 10 is wound off so much that it may be caught between the door 16 and the vehicle body. The output of the webbing wind-off amount detection switch 168 is supplied to the AND element 172B and the OR element 172C through an inverting element 172D.

Further, this circuit employs limit switches 158A, 158B which are similar to the limit switch 158 shown in FIG. 4. In this case, the limit switch 158A delivers a signal of L level only when the webbing tension takes a minimum value which is lower than a predetermined value. The output of the limit switch 158A is supplied to the AND element 172B. On the other hand, the limit switch 158B delivers a signal of L level only when the webbing tension takes a maximum value which is higher than a predetermined value. The output of the limit switch 158A is supplied to an AND element 172E, to which the output of the OR element 172C is also supplied. Accordingly, the limit switch 158A is mounted so as to be able to detect the position of the actuator 150 shown in FIG. 4, while the limit switch 158B is disposed in the same condition as the limit switch 158.

These AND elements 172B, 172E are respectively connected to relays 174A, 174B. The relays 174A, 174B are connected to the motor 164, whereby the rotational direction of the motor 164 is determined.

Thus, the operation effected by the elements 172A to 172E and the relays 174A, 174B is similar to that of the control unit 172 in the first embodiment. More specifically, when the door 16 is open and the amount of the shoulder webbing 10 wound off is below a predetermined value and further the webbing tension is not minimum, all the inputs to the AND element 172B are at the H level; hence, the relay 174A actuates the motor 164 to rotate in the direction in which the webbing tension is decreased. On the other hand, when the door 16 is closed or the amount of the shoulder webbing 10 wound off exceeds a predetermined value and the webbing tension is not maximum, all the inputs to the AND element 172E are at the H level; hence, the relay 174B actuates the motor 164 to rotate in the direction in which the biasing force of the spiral spring 140 is increased.

Figure 10:
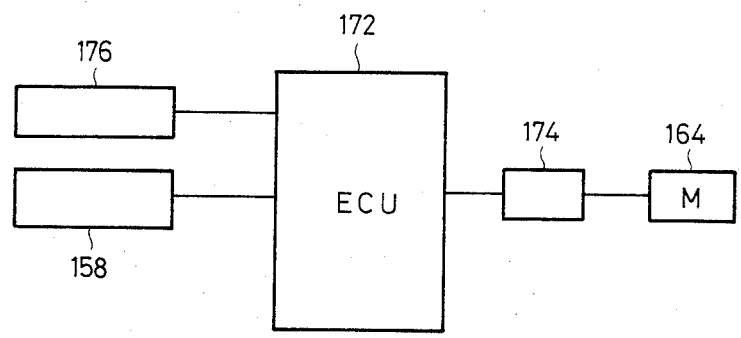
FIG. 10 is a circuit diagram of a control means employed in a third embodiment of the present invention.

FIG. 10 shows a control means in accordance with a third embodiment of the present invention. In this embodiment, only the detection signals from the limit switch 158 and the door switch 176 are input to the control unit 172. Unlike the above-described embodiments, the detection signal from the webbing wind-off amount detection switch 168 is not transmitted to the control unit 172. In this embodiment, however, the control means has a timer provided in the control unit 172 and is arranged such that the motor 164 is turned OFF when an increase in the webbing tension has been kept for a predetermined period of time after the webbing tension is increased as the door 16 is closed. On the other hand, when the door 16 is opened, the motor 164 is turned OFF after operating for a predetermined period of time so as to decrease the webbing tension.

Accordingly, in this embodiment also, it is possible to obtain an effect similar to that offered by the above-described embodiments.

Figure 11:
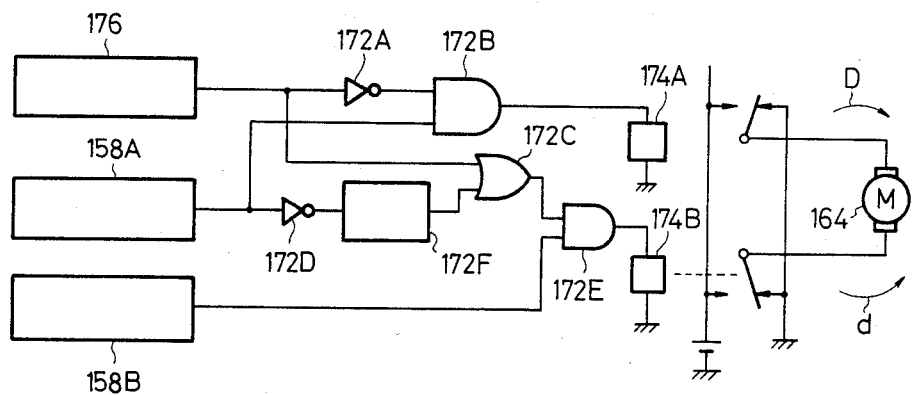
FIG. 11 is a diagram of a practical circuit in accordance with a fourth embodiment of the present invention which is also applicable to the third embodiment.

FIG. 11 shows a practical circuit in accordance with a fourth embodiment of the present invention which is also applicable to the third embodiment shown in FIG. 10.

In this embodiment also, the door switch 176 and the limit switches 158A, 158B are employed similarly to those in the above-described second embodiment of FIG. 9. Unlike the embodiment of FIG. 9, however, the webbing wind-off amount detection switch 168 is not provided in this embodiment.

More specifically, the output of the door switch 176 is supplied to the OR element 172C and to the AND element 172B through the inverting element 172A. The output of the limit switch 158A is supplied to the AND element 172B and to the OR element 172C through the inverting element 172D and a timer 172F. On the other hand, the output of the limit switch 158B is supplied to the AND element 172E, together with the output of the OR element 172C.

Accordingly, in this embodiment also, when the door 16 is opened and the tension of the webbing 10 is not minimum, all the inputs to the AND element 172B are at the H level; hence, the relay 174A actuates the motor 164 to rotate in the direction in which the biasing force of the spiral spring 140 is decreased. On the other hand, when the door 16 is closed or when the period of time set on the timer 172F has elapsed after the webbing tension becomes minimum, and when the webbing tension is not maximum, all the inputs to the AND element 172E are at the H level; hence, the relay 174B actuates the motor 164 to rotate in the direction in which the biasing force of the spiral spring 140 is increased, thereby effecting an operation similar to that effected by the above-described embodiments.

It is to be noted that, although, in the above-described embodiments, a combination of the spiral spring 140, the worm wheel 138, the worm 142 and the motor 164 is employed as a means for varying the wind-up biasing force of the webbing retractor 20, various kinds of resilient member and control means for varying the biasing force of the resilient member may be employed in the present invention.

As has been described above, the seatbelt system in accordance with the present invention is arranged such that the biasing force of the resilient member for biasing the takeup shaft is decreased by the control means if the webbing tension exceeds a predetermined value when the door is opened, and the biasing force is increased when the door is closed. Thus, the door can be easily opened with a relatively small force. In addition, it becomes possible to reduce the frictional resistance between the webbing and the body of the occupant when the webbing is unfastened from the occupant.

What is claimed is:

1. A seatbelt system including a webbing which has one end thereof attached to a door of a vehicle and is automatically fastened to an occupant of said vehicle after he is seated, comprising:
(a) a webbing retractor which is disposed in an approximately central portion of said vehicle to wind up the other end of said webbing;
(b) a resilient member which is disposed within said webbing retractor to bias said webbing in a direction in which said webbing is wound up; and
(c) control means which drives said resilient member when said door is opened so that the biasing force of said resilient member is decreased,
whereby the resistance to a door opening force encountered when said door is opened is reduced.

2. A seatbelt system according to claim 1, wherein said control means is provided with means for detecting the webbing tension and decreases the biasing force of said resilient member when said door is open and the webbing tension exceeds a predetermined value.

3. A seatbelt system according to claim 2, wherein said control means is provided with a sensor capable of detecting the fact that said door is open.

4. A seatbelt system according to claim 1, wherein said webbing retractor is provided with a takeup shaft for winding up said the other end of said webbing.

5. A seatbelt system according to claim 4, wherein said resilient member is a spiral spring which has one end thereof connected to said takeup shaft and the other end thereof connected to a motor constituting a portion of said control means, said spiral spring being changed in its biasing force by means of rotation of said motor.

6. A seatbelt system according to claim 5, wherein the driving force of said motor is transmitted to the one end of said spiral spring by the use of a combination of a worm and a worm wheel.

7. A seatbelt system according to claim 1, wherein said control means is disposed such as to bias said resilient member in a direction in which the webbing tension is increased after said door has been closed.

8. A seatbelt system according to claim 7, wherein said control means is provided with a sensor for detecting a state wherein said door is closed and a webbing tension sensor and increases the biasing force of said resilient member when said door is in a closed state and the webbing tension is below a predetermined value.

9. A seatbelt system according to claim 1, wherein said control means is provided with a sensor capable of detecting the amount of said webbing wound off from said webbing retractor and decreases the biasing force of said resilient member when the amount of said webbing wound off is below a predetermined value.

10. A seatbelt system according to claim 7, wherein said control means is provided with a sensor capable of detecting the amount of said webbing wound off from said webbing retractor and increases the biasing force of said resilient member when the amount of said webbing wound off exceeds a predetermined value.

11. A seatbelt system according to claim 1, wherein said control means has a timer and decreases the biasing force of said resilient member for a predetermined period of time after said door has been opened.

12. A seatbelt system according to claim 7, wherein said control means has a timer and increases the biasing force of said resilient member for a predetermined period of time after said door has been closed.

13. A seatbelt system comprising:
(a) a webbing which has one end thereof attached to a door of a vehicle and is automatically fastened to an occupant of said vehicle in response to the action of opening and closing said door;
(b) a webbing retractor which is disposed in an approximately central portion of said vehicle to wind up the other end of said webbing on a takeup shaft in layers;
(c) a spiral spring which is provided on said webbing retractor and has one end thereof connected to said takeup shaft so as to bias said takeup shaft in a direction in which said webbing is wound up; and
(d) control means which is provided with a webbing tension detection switch and drives said spiral spring in a direction in which the webbing tension is decreased if the webbing tension is high when said door is opened, and which drives said spiral spring in a direction in which the webbing tension is increased if the webbing tension is low after said door has been closed,
whereby the resistance to a door opening force encountered when said door is opened is reduced, and the frictional resistance between said webbing and the body of said occupant is reduced when said webbing is moved.

14. A seatbelt system according to claim 13, wherein said control means is provided with a sensor capable of detecting the amount of said webbing wound off from said webbing retractor and decreases the biasing force of said resilient member when the amount of said webbing wound off is below a predetermined value.

15. A seatbelt system according to claim 14, wherein said control means is provided with a sensor capable of detecting the amount of said webbing wound off from said webbing retractor and increases the biasing force of said resilient member when the amount of said webbing wound off exceeds a predetermined value.

16. A seatbelt system according to claim 13, wherein said control means has a timer and decreases the biasing force of said resilient member for a predetermined period of time after said door has been opened.

17. A seatbelt system according to claim 16, wherein said control means has a timer and increases the biasing force of said resilient member for a predetermined period of time after said door has been closed.

18. A seatbelt system including an occupant restraining webbing which has one end thereof attached to a door of a vehicle and the other end thereof attached to a floor member of said vehicle on the side thereof which is remote from said door across a seat, said webbing being automatically fastened to an occupant of said vehicle in response to the action of opening and closing said door, comprising:
a webbing takeup shaft which is rotatably supported within a webbing retractor;
a spiral spring which has one end thereof connected to said takeup shaft so as to apply a webbing wind-up force to said takeup shaft;
driving means which is connected with the other end of said spiral spring and is capable of changing the webbing wind-up force; and
control means which drives said driving means so as to decrease the biasing force of said spiral spring when said door is open and the webbing tension is high such that the resistance to a door opening force is reduced, and which drives said driving means so as to increase the biasing force of said spiral spring when said door is closed and the webbing tension is low such that said webbing is brought into close contact with said occupant.

19. A seatbelt system according to claim 18, wherein said control means is provided with a sensor which detects the webbing tension by detecting the repulsion force of said spiral spring.

20. A seatbelt system according to claim 18, wherein said control means is provided with a sensor capable of detecting the amount of said webbing wound off from said webbing retractor and decreases the webbing wind-up force if the webbing tension is high and the amount of said webbing wound off is small when said door is opened, but increases the webbing wind-up force if the webbing tension is low and the amount of said webbing wound off is large when said door is closed.

21. A seatbelt system according to claim 18, wherein said control means is provided with a timer in order to limit the period of time for driving effected by said driving means.

* * * * *